Walter E. Miller Jr.
Teddy J. Peacher
Walter F. Fountain,
INVENTORS.

3,493,766
OPTICAL TRACKER WITH AN L-SHAPED APERTURE FOR THE PHOTOMULTIPLIER TUBE
Walter E. Miller, Jr., 3305 Caywood Drive NW. 35810;
Teddy J. Peacher, 2109 Fulton Drive NW. 35810;
and Walter F. Fountain, 3104 Holiday Drive SW. 35805; all of Huntsville, Ala.
Filed Dec. 7, 1967, Ser. No. 688,854
Int. Cl. H01j 39/12
U.S. Cl. 250—207                          3 Claims

ABSTRACT OF THE DISCLOSURE

A photomultiplier for an optical tracker having a mask with an L-shaped aperture covering the first dynode or the cathode of the photomultiplier. The center of an image focused on the mask is nutated about a center at the intersection of the legs of the L. If the image is not on the optical axis of the photomultiplier, the center of the image focused on the mask will be nutated off the intersection of the legs of the L, and a pulse position modulated error signal will be produced.

---

The invention described herein may be manufactured, used, and licensed by or for the Government for governmental purposes without the payment to us of any royalty thereon.

Background of the invention

This invention is in the field of optical tracking using a photomultiplier detector. Known schemes of producing error signals by use of a photomultiplier are: (1) pulse duration modulation (PDM) using a single photomultiplier and, (2) pulse position modulation (PPM) using a four separate anode quadrant photomultiplier. Use of photomultiplier detection in a tracking mode has been limited to two schemes: (1) a scheme requiring more than one photomultiplier tube, or more than one photocathode, with the radiant target image optically or mechanically moved from one photomultiplier, or photocathode, to another to provide error information; or (2) a single photomultiplier containing an electron focusing system between the photocathode and a defining aperture, using the well-known, startracker mode of electron deflection for producing PDM eror signals. An example of the first scheme of the prior art is the F4002 Quadrant Multiplier Phototube, manufactured by International Telephone and Telegraph, that produces a PPM error signal but has the disadvantages of having four photomultiplier instead of one photomultiplier.

A collecting lens images the optical source radiation on the photocathode at the optical axis. With a single photomultiplier, electrons emitted from the photocathode are electrostatically focused into a parallel beam, and the beam is deflected in the star-tracker mode by an external magnetic positioned between the photocathode and a mask with a circular defining aperture positioned at the optical axis and over the first dynode. Only electrons from a small area of the photocathode at the optical axis pass through the defining aperture to the first dynode. If the optical source moves off the center of the optical axis, the collecting lens images the source radiation on the photocathode at a position off the optical axis. The result is that the electrons emitted from the photocathode will be focused and deflected off the optical axis of the photomultiplier, and will pass through the circular defining aperture in periods of unequal duration. Thus, if the optical source is off the optical axis, PDM error signals are provided with photomultipliers that use star-tracker beam deflection over a circular defining aperture. An example of this scheme of the prior art is the F4003, F4004 and F4005 Star and Laser Tracking Multiplier Phototubes, manufactured by International Telephone and Telegraph.

Information contained in the waveforms of PPM error signals have diverse applications. Some applications are: missile tracking systems, space-craft rendezvous, satellite orientation, and industrial applications where remote measurements of deviation from optical axes are desired.

The requirements of the optical tracker are simple. A line of sight must be maintained at all times between the tracked source and the optical tracker. Also, the source signal received by the optical tracker must be sufficiently stronger than noise sources to provide desired performance.

The small area of the photocathode from which electrons are emitted is at the optical axis or longitudinal axis of the photomultiplier where the optical source is focused by a collecting lens. Only slight displacement of this area is caused by movement of the optical source off the longitudinal axis of the photomultiplier. With present photomultipliers, this star-tracker mode of beam deflection over a circular defining aperture provides a PDM error signal.

Summary of the invention

This invention is a novel photomultiplier, used as an optical tracker, that produces PPM error signals with a single photomultiplier. The photomultiplier has an internal electron focusing system that deflects an electron beam in a circle over a mask with an L-shaped defining aperture. The legs of the L-shaped defining aperture are perpendicular to each other and intersect at the optical axis of the photomultiplier. The electron beam is nutated in a circle by a magnetic field produced by orthogonal sine wave reference voltages. These reference voltages are sampled each time electrons from the electron beam pass through the aperture and cause a current pulse at the anode of the photomultiplier. Another means of producing PPM error signals, using the same mask, is by rotating an optical wedge, located between a photomultiplier's collecting lens and photocathode. The rotating optical wedge will rotate a radiant target image, in a circle, over the photocathode. Electrons, emitted from the photocathode, are formed in a circular beam without the use of the internal electron focusing system and are moved over the mask.

When the optical target is on the optical axis, the sampled reference voltages will be zero amplitude. If the target is off the optical axis of the photomultiplier, the electron beam is focused off the optical axis, and the reference voltages are sampled at a time when the voltages are not at zero amplitude. The polarity of the sampled reference voltage indicates target position error, and the magnitude of the sampled reference voltage indicates the magnitude of the error.

Background noise is less in the present invention than the prior systems because the L-shaped aperture allows less noise voltage through to the anode than the circular aperture of the prior art. The optical target source can be modulated or unmodulated. If a modulated source is used, discriminating electronics (filters), inserted directly after the anode, filter out all frequencies except the source modulation frequency. The reference voltages are sampled only when a properly modulated source is nutated across the defining aperture.

It is an object of the present invention to provide a photomultiplier detector used to produce error signals modulated in the pulse position modulation mode.

It is another object of the present invention to limit background noise in a photomultiplier detector by reducing the effective area of the photocathode, and by reducing the area of an aperture of a mask covering the photocathode.

It is still another object of the present invention to determine, in a pulse position modulation mode, the angular deviation of an optical source from the longitudinal axis of a photomultiplier.

Brief description of the drawing

FIGURE 5a shows a waveform produced by prior art trackers.

Description of the preferred embodiment

Figure 1:
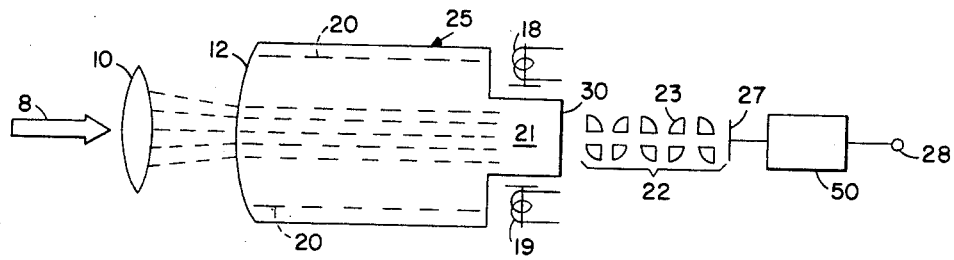
FIGURE 1 is a diagrammatic view of a prior art photomultiplier.

The preferred embodiment of the invention is similar to FIGURE 1, and a description of the prior art embodiment of FIGURE 1 is in order. Referring now to FIGURE 1, radiant energy 8 from a target source (not shown) is received at collecting lens 10. Collecting lens 10 focuses the source radiant energy on the photocathode 12 of photomultiplier 25. Electrons are emitted from photocathode 12 and are formed into a parallel beam by electrostatic focusing coil 20 wound inside the photomultiplier housing. The parallel beam of electrons is then electromagnetically deflected in the well-known, star-tracker mode by the proper inputs on deflecting coils 18 and 19. A mask (30) has a circular aperture. If the target is off the optical axis, electrons from the star-shaped electron beam are passed through the defining aperture in a PDM mode.

Figure 4A:
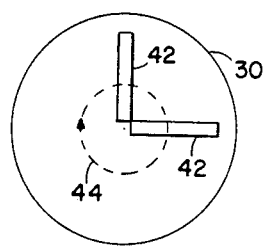
FIGURES 4a and b are diagrammatic views of the circular deflection pattern and the L-shaped defining aperture of the present invention.

The invention of FIGURE 1 is similar to the prior art except the defining aperture of mask 30 is modified into an L-shaped pattern as shown in FIGURES 4a and b, with a 10 to 1 ratio of length to width (not shown to scale) on each leg of the L. The parallel beam of electrons is electromagnetically deflected in a circle by a sine wave input and a cosine wave input on coil 18 and coil 19, respectively. These sine and cosine waves are used as reference voltages and are provided by two oscillators (not shown), or by a single oscillator and a phase-shifter. With the parallel beam of electrons deflected in a circle across the L-shaped defining aperture, a PPM error signal is passed to the first dynode 23 of secondary emission dynodes 22. This PPM error signal is amplified, and is picked off at anode 27, passed through discriminating electronics 50 where all signals are filtered out except the modulated source frequency, and passed on to processing electronics connected at terminal 28.

Figure 2:
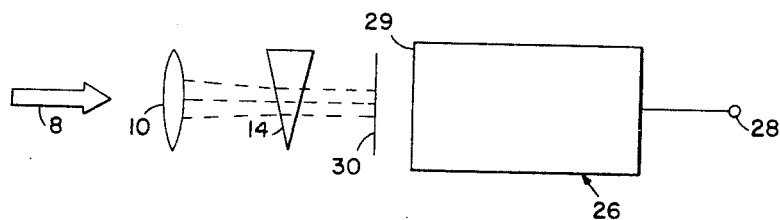
FIGURE 2 is a diagrammatic view of an embodiment of the invention.

FIGURE 2 illustrates a mechanical means of nutating the target source image from collecting lens 10 in a circle by use of optical wedge 14 and another type photomultiplier 26. Optical wedge 14 is nutated about the optical axis of photomultiplier 26. A parallel target source image is formed and is deflected in a circle across mask 30 with an L-shaped aperture. If the target is off the optical axis of photomultiplier 26, a PPM error signal is passed to photocathode 29 and is amplified in photomultiplier 26 before appearing at terminal 28.

Figure 3A:
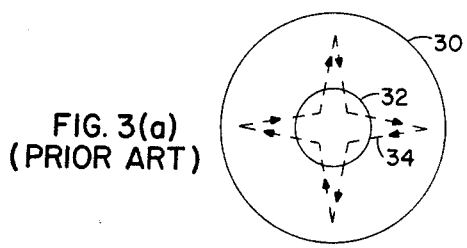
FIGURES 3a and b are diagrammatic views of a prior art star-tracker deflection pattern with a circular defining aperture.
Figure 3B:
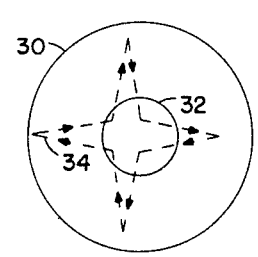

FIGURES 3a and b illustrate mask 30, with the prior art circular defining aperture 32 and star-shaped electron beam deflection pattern 34, and showing the defining aperture centered on mask 30 at the optical axis of the photomultiplier. FIGURE 3a illustrates the position of the star-shaped electron beam deflection pattern 34 when the target source is on the optical axis of the photomultiplier. FIGURE 3b illustrates one position of the star-shaped electron beam deflection pattern 34 when the target source is off the optical axis of the photomultiplier. As illustrated in FIGURE 3b, when the target source is off the optical axis, the duration of pattern 34 over aperture 32 varies in the pulse duration modulation mode, and sample waveforms produced are shown in FIGURE 5a.

Figure 4B:
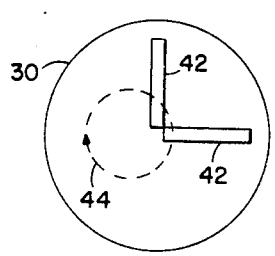

FIGURES 4a and b illustrate mask 30 with the L-shaped defining aperture 42 and circular electron beam deflection pattern 44, and showing the intersection of the L at the optical axis of the photomultiplier. FIGURE 4a illustrates the position of the circular electron beam deflection pattern 44 when the target is on the optical axis of the photomultiplier. FIGURE 4b illustrates one position of the circular electron beam deflection pattern 44 when the target source is off the optical axis of the photomultiplier. As illustrated in FIGURE 4b, when the target source is off the optical axis, the position of pattern 44 over aperture 42 varies in the pulse position modulation mode, and sample waveforms produced are shown in FIGURE 5b.

Figure 5A:
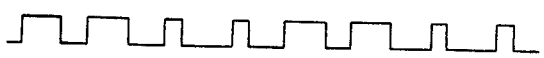
FIGURES 5a and b are waveforms modulated error signal waves.
Figure 5B:
FIGURE 5b shows a waveform of the present invention.

The waveforms of FIGURES 5a and b contain information that can be processed by processing electronics at the output of the photomultiplier. Both the PDM and PPM schemes are in common use, but no means of obtaining a PPM error signal directly from a single photomultiplier detector has been previously developed.

It will now be apparent that a PPM scheme using a single photomultiplier detector tube has been devised for detecting errors of an image source from the optical axis of the photomultiplier.

While a specific embodiment of the invention has been shown and described, other embodiments may be obvious to one skilled in the art, in light of this disclosure. The invention should be limited in scope only by the following claims.

We claim:

1. An optical tracker comprising a photomultiplier with a centrally located optical axis and having a photocathode with a masking means thereon, said masking means having an L-shaped aperture with the intersection of the legs of said L-shape at said optical axis of said photomultiplier, a means for directing an image along said axis of said photomultiplier, and a means for nutating said image across said photocathode masking means.

2. An optical tracker as set forth in claim 1 wherein said nutating means consists of wedge-shaped optics mechanically rotated about said optical axis of said photomultiplier.

3. An optical tracker as set forth in claim 1 wherein said nutating means consists of electromagnetic means for moving said image across said masking means.

References Cited

UNITED STATES PATENTS

| | | | |
|---|---|---|---|
| 2,821,643 | 1/1958 | Morton | 250—207 X |
| 3,069,553 | 12/1962 | Zoltanski | 250—237 X |
| 3,149,235 | 9/1964 | Clark | 250—207 X |
| 3,193,688 | 7/1965 | Morton et al. | 250—237 X |
| 3,320,423 | 5/1967 | Blitzer et al. | 250—207 X |
| 3,391,295 | 7/1968 | Clayton | 250—207 X |
| 2,939,962 | 6/1960 | Miller | 250—236 X |

ROBERT SEGAL, Primary Examiner

C. R. CAMPBELL, Assistant Examiner